United States Patent

Hull et al.

[11] Patent Number: 5,110,354
[45] Date of Patent: May 5, 1992

[54] CLOSED LOOP COPPER CELL EXTRACTION PROCESS

[76] Inventors: Harold L. Hull, 401 Canyon Way #43, Sparks, Nev. 89434; Robert R. Swinney, 1255 Jones St., Reno, Nev. 89503

[21] Appl. No.: 687,494

[22] Filed: Apr. 19, 1991

[51] Int. Cl.⁵ .................. B01D 11/00; C22B 15/08
[52] U.S. Cl. ............................. 75/726; 423/24
[58] Field of Search ............... 75/726; 423/24, 27, 423/32; 204/106, 108

[56] References Cited

U.S. PATENT DOCUMENTS

| | | | |
|---|---|---|---|
| 3,725,046 | 5/1973 | Hartlage et al. | 75/101 BE |
| 3,751,554 | 8/1973 | Bare et al. | 423/32 |
| 3,816,105 | 6/1974 | McKay et al. | 75/115 |
| 3,856,913 | 12/1974 | McElroy et al. | 423/27 |
| 4,023,964 | 5/1977 | De Marthe et al. | 75/101 R |
| 4,032,332 | 6/1977 | Gerlack | 75/108 |
| 4,042,664 | 8/1977 | Cardwell et al. | 423/24 |
| 4,043,882 | 8/1977 | Skarbo et al. | 204/106 |
| 4,083,758 | 4/1978 | Hamby et al. | 204/106 |
| 4,362,607 | 12/1982 | Ritcey et al. | 204/108 |
| 4,571,387 | 2/1986 | Bruynesteyn et al. | 435/262 |
| 4,582,689 | 4/1986 | Kordosky | 423/24 |
| 4,666,513 | 5/1987 | Gautier et al. | 75/117 |
| 4,696,801 | 9/1987 | Devonald et al. | 423/24 |
| 4,721,605 | 1/1988 | Brown et al. | 423/24 |
| 4,822,413 | 4/1989 | Pooley et al. | 75/118 R |
| 4,822,880 | 4/1989 | Devonald et al. | 540/492 |
| 4,927,610 | 5/1990 | Moyer et al. | 423/24 |
| 4,957,714 | 9/1990 | Olafson et al. | 423/24 |

Primary Examiner—Peter D. Rosenberg

[57] ABSTRACT

A method for the extraction of metals such as copper from ore of the same which involves re-cycling of the barren solution back to the leach pad from the various steps in the process which results in an environmentally clean leach pad with usable gravel for other uses and a high percentage yield of copper percipitate.

4 Claims, 1 Drawing Sheet

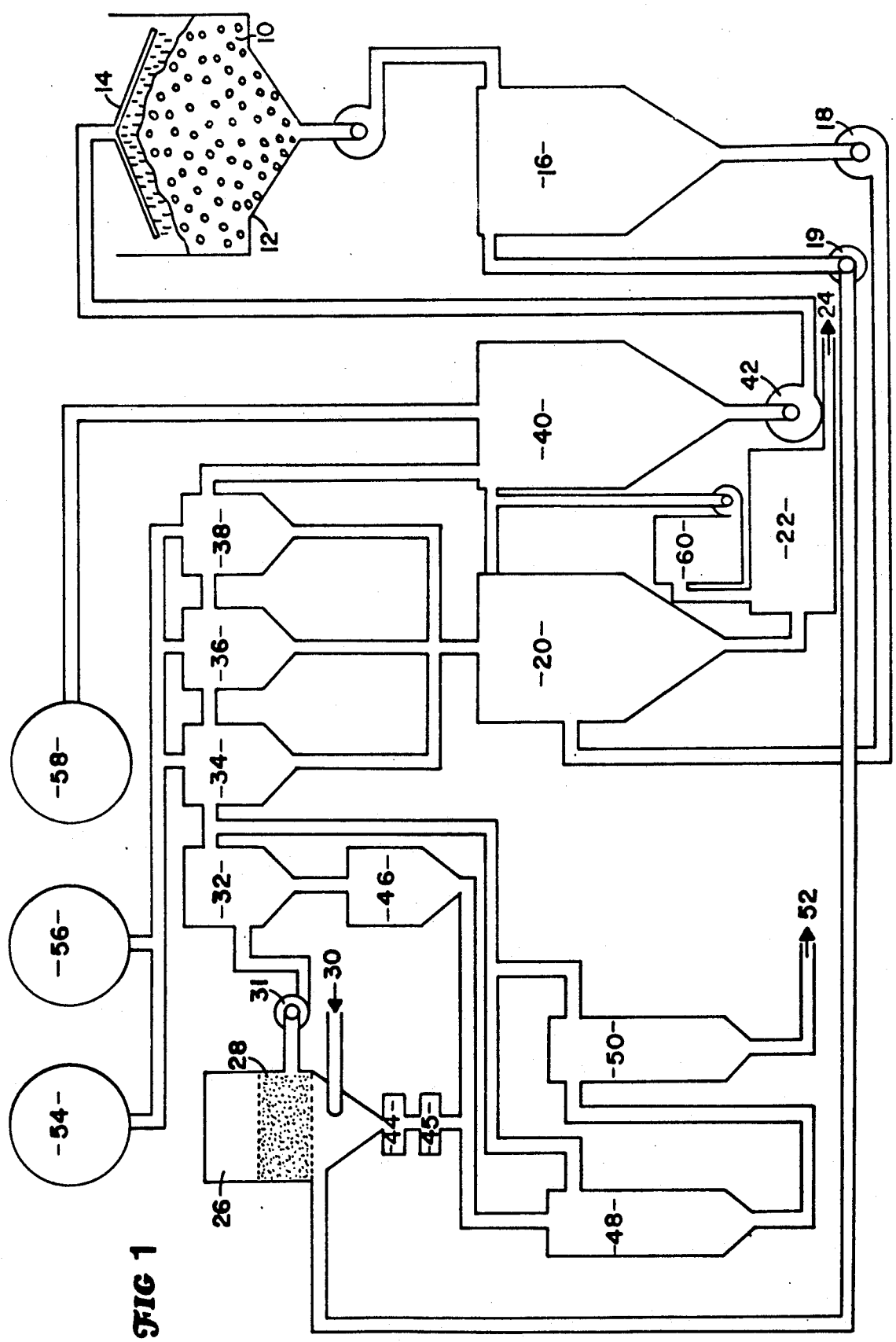

CLOSED LOOP COPPER CELL EXTRACTION PROCESS

This invention is in the field of processes for recovering dissolved metal values from solutions containing same and more particularly to that of copper.

BACKGROUND OF THE INVENTION

There are many known processes for recovering dissolved copper values from solutions containing same and most of these are concerned with the recovery of copper values from pregnant leach solutions derived by leaching sulfide copper ore material with a weak sulfuric acid lixiviant. The most commonly employed process in this connection is the so-called "cementation" of metallic copper on metallic iron employed as a precipitant, followed by pyrometallurgical and electrolytic purification of the precipitated copper.

There have been no truly radical technological changes or advances in several decades in this field and only incremental improvements in existing methods and adaptations of other types of technology to mining have gradually reduced costs and increased productivity.

In the past several decades, little emphasis was placed on environmental impact left by copper mining. The process left the tailings with unsafe environmental chemicals which re-enter the earth's natural drain and water systems with the leached tailings being in a condition and of a size which cannot be used for other purposes.

Also, in the past, mining interests were concerned with only large deposits and were satisfied to remove less than 60 percent of the copper present and were satisfied economically with the return on their investment. However, in recent years, mining interests are taking a second look at smaller deposits, low grade deposits, mine tailings, and waste dumps with an attempt to find solutions to comply with extensive environmental regulations related to air, water, and soil quality with better material handing and disposal practices.

SUMMARY OF THE INVENTION

It is therefore, a primary object to provide a Closed Loop Copper Cell Extraction Process which will remove upwards to 95 percent of the copper from its ore.

It is a further object to provide a method of extracting copper from its ores that is environmentally clean.

Still another object is to provide a process to re-cycle solutions and bi-products of extraction.

Yet another object is to make a hi-grade copper precipitate that is 94-98 percent pure copper with a particle size ranging from 15 microns to −10 microns.

Another object is to be able to reduce set-up costs by eliminating equipment such as a "ball" mill by using crushed ore between ⅜ inches and 10 mesh.

Still another important object is to leave the ore from the leach pad with a pH that is environmentally safe.

Yet another object is to leave the ore from the leach pad in a size which is ideal for roadbase, gravel, or other usable commodities such as building and construction materials.

Yet another object is to provide a process which is economically feasible which will meet the Local, State and Federal E.P.A. Standards.

Other objects and advantages will become obvious when taken into consideration with the following drawings and specifications.

BRIEF DESCRIPTION OF THE DRAWING

FIG. 1 is a flow chart of one processing module.

DETAILED DESCRIPTION OF THE DRAWING

Referring now to the drawing in detail, wherein like characters refer to like elements, 10 is a typical leach pad with containment means 12 with 14 being a sprinkler system, while 16 is a solid-solution separator with pump 18 pumping solids into scrubber 20, the solids being then directed through the decanter centrifuge 22 to sludge pond 24 (not shown). Also, the pregnant solution from the solid-solution separator 16 is pumped by pump 19 into the copper precipitator 26, which contains iron 28 with air input 30. The baren solution is now pumped by pump 31 into the micro copper collector 32 and then through the multiple iron salt precipitators 34, 36 and 38, respectively, to the acid make-up tank 40 and then is pumped by pump 42 back to the sprinkler system 14 to complete the barren solution loop.

The solids from the copper precipitator 26 are directed into a collector 44 and then into a magnetic separator 45 removing the magnetic iron from the copper metal. Meanwhile, the metallic copper from the micro copper collector 32 is passed through the micro copper holding tank 46 and then, along with the metallic copper from the magnetic separator 45, enters the first hydro-cyclone 48, and then to the second hydro-cyclone 50, and finally the now nearly pure copper precipitate enters the inert dryer 52 (not shown). Meanwhile, the barren solution from hydro-cyclones 48 and 50 are directed back into the barren solution loop at the input to the first iron salt precipitator 34. Barren solution from the decanter centrifuge 22 is also pumped into tank 60, and then back into the barren solution closed loop by entering the acid make-up tank.

Chemical storage tanks 54 and 56, respectively, supply chemicals to the iron salt precipitators 34, 36 and 38, respectively, while acid storage tank 58 supplies the acid make-up tank 40.

Make-up water to the closed loop system is supplied from a holding pond (not shown).

It is to be understood that the pumps that are shown are only typical. Many pumps are used whenever necessary to pump either the pregnant solution, barren solution or solids to the next station. It is also understood that the entire system is monitored by sensors and controls which are not shown, but are common to such systems.

It will now be seen that we have provided a system or process which is a closed loop, that is, whenever pregnant solutions, or barren solutions are processed they are eventually restored to the leach pad through the sprinkler system and are continually re-cycled until virtually all of the copper and iron is removed from the pregnant and/or barren solution, leaving the leach pad ore in a clean condition suitable for use for other purposes such as roadbeds, gravel, or building and construction materials.

It will also be seen that we have provided a process that produces a hi-grade copper precipitate that is upwards to 98 percent pure copper with a particle size ranging from 15 microns to −10 microns.

It will also be noted that we have eliminated the necessity of using a "ball" mill as the process does not require the ore to be crushed smaller than ⅜ inch to 10 mesh.

We have also washed the ore by re-cycling until the pH of the ore is environmentally safe.

Also, we have provided a process that is economically feasible which will meet the Local, State and Federal E.P.A. Standards.

It is also to be understood that while we have shown the removal of copper from its ore as a preferred embodiment, other metals may be removed from their ore's by substantially the same process.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A process for obtaining copper precipitate from copper bearing ores comprising; a leach pad, a lixivial solution, means to deliver and distribute said lixivial solution to said leach pad, a solid-solution separator, said separator separating the pregnant solution resulting from said leach pad into at least first and second parts, said first part being a pregnant solution, a scrubber, means to deliver said second part from said solid-solution separator to said scrubber, a decanter centrifuge, means to deliver said second part from said scrubber to said decanter centrifuge, said decanter centrifuge producing at least first and second parts, said first part being a pregnant solution, a sludge pond, means to deliver said second part from said decanter centrifuge to said sludge pond, a copper precipitator, means to deliver said first part from said solid-solution separator to said copper precipitator, said copper precipitator containing iron, said copper precipitator having a source of compressed air, said copper precipitator producing at least first and second parts, said first part being a barren solution, said second part being a mixture of at least copper and iron, a collector, means to deliver said last named second part to said collector, a magnetic separator, means to deliver last named second part to said magnetic separator, said magnetic separator producing at least first and second parts, said last named first part being magnetic, said last named second part being nonmagnetic, means to remove said last named first part from said magnetic separator, a first hydro-cyclone, means to deliver said last named second part to said first hydro-cyclone, a second hydro-cyclone, said first and second hydro-cyclones producing at least first and second parts, said last named first part being a barren solution, means to deliver said last named second part from said first hydro-cyclone to said second hydro-cyclone, an inert dryer, means to deliver said last named second part from said second hydro-cyclone to said inert dryer, a micro copper collector, means to deliver said first part from said copper precipitator to said micro copper collector, said micro copper collector producing at least first and second parts, said last named first part being a barren solution, a micro copper holding tank, means to deliver said last named second part from said micro copper collector to said micro copper holding tank, means to deliver last named second part from said micro copper holding tank to said first hydro-cyclone, a first iron salt precipitator, means to deliver said last named first part from said micro copper collector to said first iron salt precipitator, means to deliver said first parts from said first and second hydro-cyclones to said first iron salt precipitator, said first iron salt precipitator producing at least first and second parts, said last named first part being a barren solution, a second iron salt precipitator, means to deliver said last named first part from said first iron salt precipitator to said second iron salt precipitator, said second iron salt precipitator producing at least first and second parts, said last named first part being a barren solution, a third iron salt precipitator, means to deliver said last named first part from said second iron salt precipitator to said third iron salt precipitator, said third iron salt precipitator producing at least first and second parts, said last named first part being a barren solution, an acid make-up tank, means to deliver said last named first part from said third iron salt precipitator to said acid make-up tank, means to deliver output from said acid make-up tank to said means to deliver and distribute said lixivial solution, means to deliver said second parts from said first, second and third iron salt precipitators to said scrubber, a first and second chemical solution, a first and second chemical solution storage tank, means to deliver said chemical solutions from said storage tanks to said first, second and third iron salt precipitators, an acid, an acid storage tank, means to deliver said acid from said acid storage tank to said acid make-up tank, make-up water, means to deliver said make-up water into said process, a holding tank, means to deliver said first part from said decanter centrifuge to said holding tank, and means to deliver said last named first part from said holding tank to said acid make-up tank.

2. The process of claim 1 in which said means to deliver and distribute said lixivial solution to said leach pad is a sprinkler system.

3. The process of claim 1 in which said means to deliver is a pump.

4. The process of claim 1 in which said means to deliver is by gravity.

* * * * *